(12) United States Patent
Falk et al.

(10) Patent No.: US 11,032,250 B2
(45) Date of Patent: Jun. 8, 2021

(54) PROTECTIVE APPARATUS AND NETWORK CABLING APPARATUS FOR THE PROTECTED TRANSMISSION OF DATA

(71) Applicant: Siemens Aktiengesellschaft, Munich (DE)

(72) Inventors: Rainer Falk, Poing (DE); Steffen Fries, Baldham (DE); Stefan Seltzsam, Aying (DE)

(73) Assignee: SIEMENS AKTIENGESELLSCHAFT

( * ) Notice: Subject to any disclaimer, the term of this patent is extended or adjusted under 35 U.S.C. 154(b) by 256 days.

(21) Appl. No.: 15/807,639

(22) Filed: Nov. 9, 2017

(65) Prior Publication Data

US 2018/0145952 A1 May 24, 2018

(30) Foreign Application Priority Data

Nov. 17, 2016 (DE) .................... 10 2016 222 617.7
Nov. 23, 2016 (EP) ..................... 16200260

(51) Int. Cl.
*G06F 21/60* (2013.01)
*H04L 29/06* (2006.01)
(Continued)

(52) U.S. Cl.
CPC .......... *H04L 63/0428* (2013.01); *G06F 21/60* (2013.01); *H04L 9/12* (2013.01);
(Continued)

(58) Field of Classification Search
CPC ....... G06F 21/60; G02B 6/3817; H01B 11/22; H04L 63/0428; H04L 63/162; H04L 63/166
See application file for complete search history.

(56) References Cited

U.S. PATENT DOCUMENTS 5,778,071 A    7/1998    Caputo et al.
7,984,495 B1   7/2011    Aravind
(Continued)

FOREIGN PATENT DOCUMENTS

CN    103299310 A    9/2013
CN    103455446 A   12/2013
CN    103944865 A    7/2014

OTHER PUBLICATIONS

Kent K Seo BBN Technologies S: "Security Architecture for the Internet Protocol; rfc4301. txt", Network Working Group RFC 1717, Internet Society (ISOC) 4, Rue Des Falaises CH-1205 Geneva, Switzerland, CH, XP015043220, ISSN: 0000-0003; das ganze Dokument; 2005.

(Continued)

*Primary Examiner* — Daniel B Potratz
(74) *Attorney, Agent, or Firm* — Schmeiser, Olsen & Watts LLP

(57) ABSTRACT

Provided is a network cabling apparatus and protective apparatus for the protected transmission of data, comprising two protective devices which are assigned to one another and can each be connected to one end of a data transmission device, each protective device having: a first interface for connection to the data transmission apparatus; a second interface for connection to a device; and a crypto unit which has a cryptographic function that can be configured in an equivalent manner on each of the assigned protective devices and which cryptographically protects the data to be transmitted.

18 Claims, 2 Drawing Sheets

(51) Int. Cl.
*H04L 9/12* (2006.01)
*H01B 11/22* (2006.01)
*H01R 31/06* (2006.01)
*H01R 24/28* (2011.01)
*G02B 6/38* (2006.01)
*H04B 10/85* (2013.01)

(52) U.S. Cl.
CPC ........ *H04L 63/0464* (2013.01); *H04L 63/162* (2013.01); *H04L 63/166* (2013.01); *G02B 6/3817* (2013.01); *H01B 11/22* (2013.01); *H01R 24/28* (2013.01); *H01R 31/065* (2013.01); *H04B 10/85* (2013.01); *H04L 63/164* (2013.01)

(56) References Cited

U.S. PATENT DOCUMENTS

| | | | |
|---|---|---|---|
| 8,095,713 B2 * | 1/2012 | Minoo | G06F 21/44 710/104 |
| 8,165,295 B2 | 4/2012 | Ito et al. | |
| 8,477,937 B2 | 7/2013 | Akhavan-Toyserkani et al. | |
| 2002/0162026 A1 | 10/2002 | Neuman | |
| 2003/0058274 A1 | 3/2003 | Hill et al. | |
| 2004/0054914 A1 * | 3/2004 | Sullivan | G06F 21/606 713/189 |
| 2005/0114710 A1 * | 5/2005 | Cornell | G06F 21/57 726/4 |
| 2005/0175184 A1 * | 8/2005 | Grover | H04L 63/0457 380/278 |
| 2006/0036854 A1 | 2/2006 | Liu | |
| 2006/0064736 A1 * | 3/2006 | Ahuja | G06Q 20/027 726/1 |
| 2006/0204009 A1 * | 9/2006 | Li | H04J 13/00 380/255 |
| 2008/0189556 A1 | 8/2008 | Modica et al. | |
| 2010/0205454 A1 * | 8/2010 | Wu | G06F 21/85 713/189 |
| 2011/0154050 A1 | 6/2011 | Cordery et al. | |
| 2011/0252244 A1 | 10/2011 | Lesea | |
| 2013/0151844 A1 | 6/2013 | Messerschmidt | |
| 2013/0191907 A1 | 7/2013 | Falk et al. | |
| 2013/0305062 A1 | 11/2013 | Falk et al. | |
| 2013/0316583 A1 * | 11/2013 | Scherer | H01R 13/6658 439/620.23 |
| 2013/0326232 A1 | 12/2013 | Lewis et al. | |
| 2015/0067352 A1 | 3/2015 | Winslow | |
| 2015/0310232 A1 * | 10/2015 | Biggs | G06F 21/85 726/34 |
| 2015/0334166 A1 * | 11/2015 | Warden | H04L 67/10 713/156 |
| 2016/0099530 A1 * | 4/2016 | Valenti | H01R 24/64 439/639 |
| 2017/0026843 A1 * | 1/2017 | Lazaravich | H04L 63/1466 |
| 2019/0332563 A1 * | 10/2019 | Troger | G06F 13/4068 |

OTHER PUBLICATIONS

Non-English Chinese Office Action dated Jun. 3, 2020 for Application No. 201711146366.X.

* cited by examiner

PROTECTIVE APPARATUS AND NETWORK CABLING APPARATUS FOR THE PROTECTED TRANSMISSION OF DATA

CROSS-REFERENCE TO RELATED APPLICATIONS

This application claims priority to European Application No. 16200260.4, having a filing date of Nov. 23, 2016 and German application No. 10 2016 222 617.7, having a filing date of Nov. 17, 2016, the entire contents both of which are hereby incorporated by reference.

FIELD OF TECHNOLOGY

The following relates to a protective apparatus for the protected transmission of data, comprising two protective devices which are assigned to one another and can each be connected to one end of a data transmission device, and to a network cabling apparatus comprising a protective apparatus and a data transmission device.

BACKGROUND

Security-relevant data are being increasingly acquired in devices and transmitted via a data communication network. In many cases, security-relevant data contain information which is worthy of protection, for example personal data, but also control messages for controlling devices. In order to protect such data communication from manipulation and/or eavesdropping, devices communicating with one another, for example a field device and a control device of an automation installation, can cryptographically protect the communication, that is to say can interchange the data in encrypted form and/or in a form protected by means of a cryptographic checksum. However, for this purpose, a corresponding functionality must be available on the devices and must be configured according to the incorporation in a data communication network. If a corresponding functionality is not available on the devices themselves, remote security apparatuses, for example firewalls or gateways, may be upstream of the device, which security apparatuses set up a virtual private network connection (VPN) for the device and connect the devices to another, for example.

WO 2012/041654 describes, for example, a VPN box which is assigned to at least one of the communication partners for the purpose of setting up and operating a virtual private network connection. In order to circumvent complicated configuration of this VPN box, a secret key of the assigned communication participant is determined when setting up the connection and a session key is in turn set up using the secret key. Such VPN boxes are mainly used during a communication connection via public data networks.

However, communication connections can be protected only to a limited extent even within closed data networks. The network cabling cannot be protected everywhere, for example by means of lockable installation cabinets or operating halls. In automation installations, known technologies for protecting data transmission, in particular control, monitoring, diagnostic or configuration data, are also used only in places on account of the associated set-up and operating effort.

SUMMARY

An aspect relates to data transmission between devices which is protected from manipulation and/or eavesdropping in a simple and cost-effective manner and with little configuration effort.

According to a first aspect, embodiments of the invention relates to a protective apparatus for the protected transmission of data, comprising two protective devices which are assigned to one another and can each be connected to one end of a data transmission device, each protective device having a first interface for connection to the data transmission device, a second interface for connection to a device, and a crypto unit, and the crypto unit having a cryptographic function that can be configured in an equivalent manner on each of the assigned protective devices and cryptographically protects the data to be transmitted.

This has the advantage that, when incorporating a device in a data communication network, only the protective apparatus together with a data transmission device, for example a network cable, an optical waveguide or a radio apparatus, must be installed, but there is no need for any effort for setting up an external security apparatus or for configuring an internal security function.

The crypto units of the at least two cryptographic protective devices assigned to one another are set in such a manner that only precisely these protective devices can communicate with one another. In this case, "cryptographic functions configured in an equivalent manner" means that cryptographic functions in the assigned protective devices are configured in an identical manner for a data transmission direction. The cryptographic functions may be configured differently for different transmission directions. Accordingly, the cryptographic functions can be configured in an identical manner or differently in the transmission and reception directions in a crypto unit.

The cryptographic function carries out, in particular, a symmetrical cryptographic method with a symmetrical key. The symmetrical key can be used directly for encryption or to protect a session key negotiation.

The cryptographic function encrypts or decrypts the data to be transmitted or generates a cryptographic checksum or verifies a cryptographic checksum.

In particular, the device itself may not provide its own security function. The protective devices assigned to one another are preferably in the form of plug connectors which can be connected to the data transmission device in a releasable manner as adapters or else in a fixed manner via the first interface. The protective devices can be directly connected to the communicating devices, for example, via the second interface. However, the protective devices assigned to one another can also be installed as a separate component in plug connectors.

The crypto unit may be in the form of a processor or an electronic circuit, for example. A processor may be, for example, a main processor (central processing unit, CPU), a microprocessor or a microcontroller, for example an application-specific integrated circuit or a digital signal processor, possibly in combination with a memory unit for storing program instructions or configuration data etc. A processor may also be, for example, an IC (integrated circuit), for example, an FPGA (field programmable gate array) or an ASIC (application-specific integrated circuit), or a DSP (digital signal processor).

In one embodiment, at least one of the protective devices has a display unit which provides an electrical and/or optical status signal on the basis of the operating status of the cryptographic connection set up between the protective devices.

This has the advantage that an electrical status signal, for example, is made available to the connected device and, for example, to the network interface of the device via the second interface if the cryptographic connection has been set up. The device can transmit data to the protective device or can receive data from the protective device only after receiving the electrical status signal, for example. At the same time or alternatively, an optical status signal can also be generated and can be provided via a light-emitting diode, for example. This has the advantage that a cable is identified by installation personnel, for example, as plugged in or physically connected only when the logical connection, that is to say a protected connection of the cable, has been set up.

In one embodiment, the cryptographic function is fixed or changeable in the crypto units.

The cryptographic function comprises, for example, a symmetrical key which is the same in each of the assigned security devices. The cryptographic function is already provided during production, for example, and is set up in the crypto unit. If the cryptographic function is implemented in a fixed manner, that is to say cannot be changed, no configuration whatsoever is required and the amount of work is minimized.

If the cryptographic function is changeable, the length of a cryptographic key contained in the cryptographic function, for example, can be set on the basis of the devices to be connected.

The setting can be changed, for example, by mechanically actuating a setting device, such as a switch, or else by means of mechanical movement, for example shaking. For example, a mechanical movement which is the same for both protective units can generate additional information which is included in the configuration of the cryptographic function.

In one embodiment, the cryptographic function encrypts or decrypts the data on a physical transmission level according to an OSI reference model.

A layer architecture for network protocols which has been published as a standard by the International Telecommunications Union (ITU) and the International Organization for Standardization (ISO) is referred to as an OSI reference model. The cryptographic function on the physical transmission level, also referred to as layer 1, causes virtually no transmission delay and is independent of the transmission protocol of the data link layer, also called layer 2, above it. Such a cryptographic function can therefore be used in any desired manner for Internet-based connections, serial or powerline connections or else for bus systems.

In one embodiment, the data are modulated by means of a cryptographic spreading code on the physical transmission level.

This has the advantage that only a short transmission delay is produced. The symbol clock of the useful data to be transmitted can be used for synchronization, for example. As a result of a cryptographically generated spreading code, it is scarcely possible for an unauthorized third party to introduce data since the spreading code used can be determined only with a large amount of effort. Alternatively, the spreading code can also be changed on the basis of time, for example.

In one embodiment, the cryptographic function encrypts or decrypts the data to be transmitted on a data link layer according to the OSI reference model.

This has the advantage that known cryptographic functions which can be implemented in a simple manner, for example a MACsec method, can be used. On the other hand, such a protective apparatus operates only with provided communication protocols, for example Ethernet.

In one embodiment, the cryptographic function encrypts or decrypts the data to be transmitted on a network layer of the OSI reference model.

This has the advantage that an IPsec protocol, for example, can be used to set up a secure data tunnel.

In one embodiment, each protective device is assigned a fixed IP address or an IP address provided by the connected device via the first interface.

Since the IP addresses are known only to the protective devices assigned to one another, collisions with externally allocated IP addresses can be excluded. IPv6 link local addresses can also be selected and used, in particular, as IP addresses by the protective devices.

In one embodiment, the cryptographic function encrypts or decrypts the data to be transmitted on a transport layer of the OSI reference model.

This has the advantage that it is possible to use, for example, a tunnel according to the transport layer security protocol or a datagram transport layer security protocol, which are suitable, in particular, for TCP-based or UDP-based communication.

In one embodiment, the crypto unit outputs incoming data with a firmly predefined time delay or a delay dependent on a type of data transmission.

This has the advantage that no variable delays can arise as a result of sporadically occurring effects. This is important, in particular, when transmitting control data or during time synchronization. A single delay time can be firmly predefined. However, different delay times can also be predefined on the basis of a type of data transmission, for example the packet type or a packet length. However, the delay is then fixed for all data of a type of data transmission.

This has the advantage that no sporadically occurring effects can arise as a result of variable delays. This is important, for example, during control tasks or during time synchronization. As a result, the delay does not depend on the packet length, for example, and the cable appears simply as a long cable connection with an accordingly longer transmission time.

In one embodiment, the protective device has an integrated current source or draws electrical current from a connected device via the first interface or draws electrical current via a third interface or draws electrical current from the data transmission signal itself.

A current source integrated in the protective device has the advantage that the protective device operates independently of the connected devices and also does not load the device in the case of devices having a limited current supply. On the other hand, a protective device which draws the electrical current from a connected device has the advantage of being able to have a compact design without its own additional current source. A current supply via a third interface provides an optimum current supply for the protective device without loading the connected device. Furthermore, a sufficient current supply is guaranteed independently of the connected device or an integrated separate current source.

In one embodiment, each protective device of a protective apparatus has withdrawal protection for releasing the first interface from the data transmission unit and/or for releasing the second interface from the device.

This prevents the protective devices from being replaced by a data transmission unit, for example a network cable or on the device itself.

In one embodiment, the protective device cancels the cryptographic function if the protective device is disabled or if manipulation of the protective device is determined.

This prevents an unauthorized third party from reading or manipulating the cryptographic function. The cryptographic function preferably cannot be read or manipulated or can be read or manipulated only with a large amount of effort.

According to a second aspect, embodiments of the invention relates to a network cabling apparatus comprising a protective apparatus having the features already described and a data transmission device, the at least two ends of the data transmission device being connected to one protective device of the protective apparatus in each case.

This has the advantage that there is no or only minimal configuration effort in the case of such a network cabling apparatus and devices which are not very complex can therefore also securely interchange data without a large amount of installation and configuration effort.

In one embodiment, the data transmission unit is a cable for transmitting electrical signals or a fiber-optic cable.

As a result of the cryptographic function contained in the protective device, secure transmission is possible independently of the physical type of transmission of the signals. Therefore, it is possible to use cables to transmit electrical signals or also fiber-optic cables to transmit optical signals. Radio-based data transmission could likewise be protected in the case of an additional radio transmission component in a protective device.

BRIEF DESCRIPTION

Some of the embodiments will be described in detail, with reference to the following figures, wherein like designations denote like members, wherein.

Parts which correspond to one another are provided with the same reference symbols in all figures.

DETAILED DESCRIPTION

Critical communication, for example control communication in an automation network or else in a private network, is transmitted via data communication networks. In this case, devices communicating with one another are transmitted via a data transmission device, for example a network cable which is in the form of an electrical cable or a fiber-optic cable or else is in the form of a radio connection.

Figure 1:
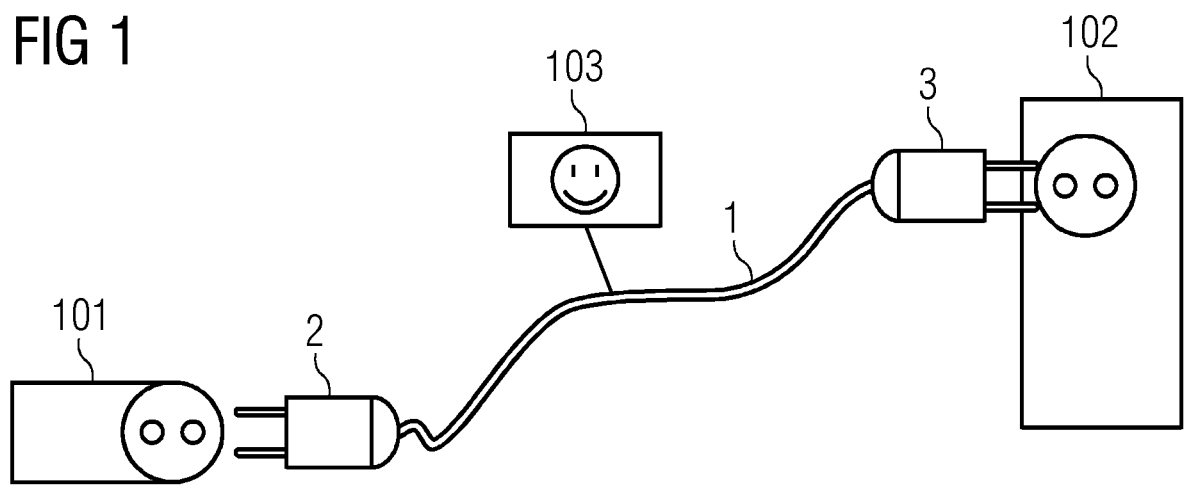
FIG. 1 shows a schematic illustration of an attack scenario when using a data transmission apparatus according to the prior art.

FIG. 1 shows an attack scenario when using a known data transmission device 1. The device 101, for example a field device, is connected to a second device 102, for example a control apparatus, via the data transmission device 1. The data transmission device 1 is, for example, an electrical cable or a fiber-optic cable or a radio transmission path. In order to transmit data, plug connectors 2, 3 of the data transmission device 1 are connected, for example, to a network interface of the devices 101, 102 in order to establish a connection between the two devices 101, 102.

If the arrangement shown is situated in an accessible environment, an attacker 103 can disconnect the data transmission device 1, for example, can eavesdrop the transmitted data and/or can feed in falsified data frames and can therefore manipulate the data.

Figure 2:
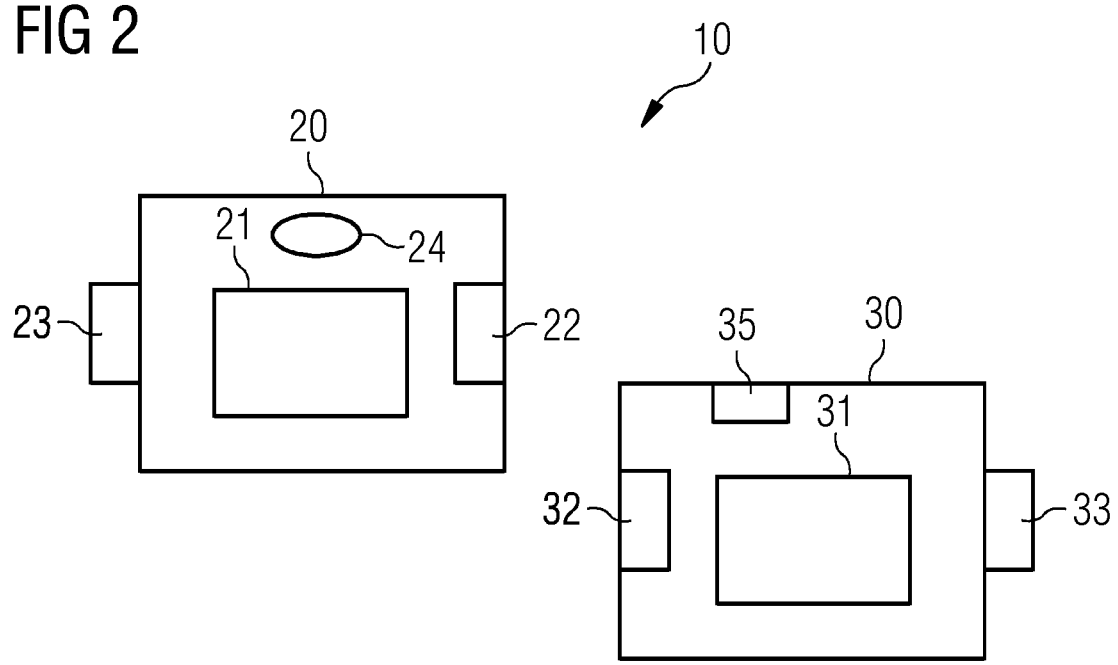
FIG. 2 shows a block diagram of an exemplary embodiment of a protective apparatus according to embodiments of the invention.

FIG. 2 now shows a protective apparatus 10 which makes it possible to implement a cryptographically secure data connection between the devices 101 and 102 without having to interpose or implement additional external or internal security components.

The protective apparatus 10 comprises two protective devices 20, 30 which are assigned to one another and may be, for example, in the form of external plug connectors, that is to say adapters, or a component in the plug connectors 2, 3 of a data transmission device 1. Each of the protective devices 20, 30 has a first interface 22, 32 which can be directly connected to a network cable, for example. Each protective device 20, 30 also has a second interface 23, 33 which can be directly connected to the communicating devices 101, 102, for example can be plugged into the latter. The second interface may be in the form of an Ethernet connector, for example.

Each of the protective devices 20, 30 of the protective apparatus 10 comprises a crypto unit 21, 31 on which the same cryptographic function is formed in each case. The cryptographic function is preconfigured in this case and encrypts the data received via the second interface 23 of the protective device 20 and outputs them to a data transmission device via the first interface 22. The protective device 30 which is connected to the other end of the data transmission device receives the encrypted data via the first interface 32 and decrypts the data using the cryptographic function implemented in its crypto unit 31. The decrypted data are output to a connected device via the second interface 33.

The cryptographic function may be changed or extended, for example, by means of a setting component or else by means of mechanical movement. For example, an identical cryptographic key of a symmetrical cryptographic function is included in the crypto function of each of the protective devices 20, 30 assigned to one another, or a key pair is included in an asymmetric cryptographic function and is set in such a manner that only precisely these two protective devices can communicate with one another. Authenticity of the transmitter or receiver of the data, that is to say of the protective devices 20, 30 assigned to one another here, is therefore ensured.

The cryptographic function sets up a communication connection between the protective devices 20, 30. The integrity of the data to be transmitted can be achieved using network protocols on different layers of the communication connection. Layers of the communication connection can be understood here as meaning the transmission levels according to the standardized OSI reference model for data transmission. For example, the cryptographic function can be modulated by modulating the data signal using a cryptographic generated spreading code. In this case, the modulation is preferably synchronized with a symbol clock of the transmitted data. Alternatively, it is possible to use a spreading code with a considerably higher rate than the data rate. Alternatively, it is also possible to monitor the symbol rate. The use of spreading codes operates on the physical transmission level, that is to say layer 1 of the OSI reference model. Such a cryptographic function may be used independently of a layer 2 protocol above it and can be used, for example, for Ethernet-based connections, serial connections, connections via a power cable, so-called powerline connections, or else for the data transmission via a bus system such as Profinet.

The cryptographic function may be implemented on the data link layer, that is to say level 2 of the OSI reference model, and can be used using methods, for example media access code security MACsec or the layer 2 transport protocol (L2TP) with the IP security protocol. A data cable having a corresponding protective device operates during Ethernet-based communication.

However, the crypto unit 21, 31 can also have a cryptographic function which protects data communication using a protocol on the network layer, that is to say level 3 of the OSI reference model, for example implemented by the IP security protocol in the tunnel mode. The IP addresses used for the tunnel may be firmly assigned to the crypto unit 21, 31, for example, or may be provided by a connected device via the first interface. Since the IP addresses are known only to the assigned protective devices, collisions with externally allocated IP addresses are scarcely possible. IPv6 link local addresses, for example, can be selected and used by the protective devices as external IP addresses. Such a cryptographic function can be used for any IP-based communication connection.

The cryptographic function may also be formed on the transport level, that is to say level 4 according to the OSI reference model, for example by setting up a transport layer security TLS protocol tunnel. However, such a protective apparatus can then only be used for TCP-based or UDP-based communication. In another embodiment, IP packets or layer 2 frames are transmitted via the TLS protocol tunnel.

The cryptographic unit 21, 31 or the cryptographic function implemented thereon preferably encrypts the data with a fixed predefined delay. Data received from a device 101, 102 via the second interface 23, 33 are accordingly encrypted with a delay or are decrypted with a delay before being output to the receiving device. This ensures a deterministic data transmission behavior, with the result that no sporadically occurring effects result in variable delays. The delay can be firmly predefined independently of the type of data packet. However, the delay may also depend on the type of data packets, for example may be stipulated differently depending on the type or length of data packets. However, the delay is then firmly set up for a type of data packet. The delay therefore does not depend on the data packet length, for example.

At least one of the protective devices 20, 30 of a protective apparatus 10 has a display unit 24 which displays a status of the cryptographically secure communication connection. A fault or failure of the secure connection set-up can be displayed, for example. It is possible to display that a cryptographic connection is being set up and it is possible to display, in particular, when a secure connection has been set up completely. This can be displayed, for example, in a color-coded manner using one or more optical displays such as light-emitting diodes or else using a display or by means of an acoustic signal. In particular, the display unit generates an electrical signal which is displayed to the connected devices via the second interface when a protected communication connection has been set up. Therefore, a cable is identified by a network interface of the device 101, 102 as plugged in or physically connected only when the logical connection has been set up.

A supply of energy to the crypto unit 21 is implemented, for example, as "Power over Ethernet" by means of a direct current supply during data transmission via a powerline connection by means of Powerline or by obtaining electrical energy from sources such as the ambient temperature, vibration or air flow or the like. In one embodiment, at least one protective device 20, 30 of the protective apparatus 10 contains an integrated current source, for example a battery or a rechargeable battery. Alternatively, a separately connectable current supply via a third interface 35, for example an additional USB connection, is possible at at least one of the protective devices 20, 30. In one embodiment, a battery or rechargeable battery or super cap capacitor is charged if a current supply via Power over Ethernet or an external current supply is present. This has the advantage that protected data transmission is possible even if the current supply is interrupted.

Figure 3:
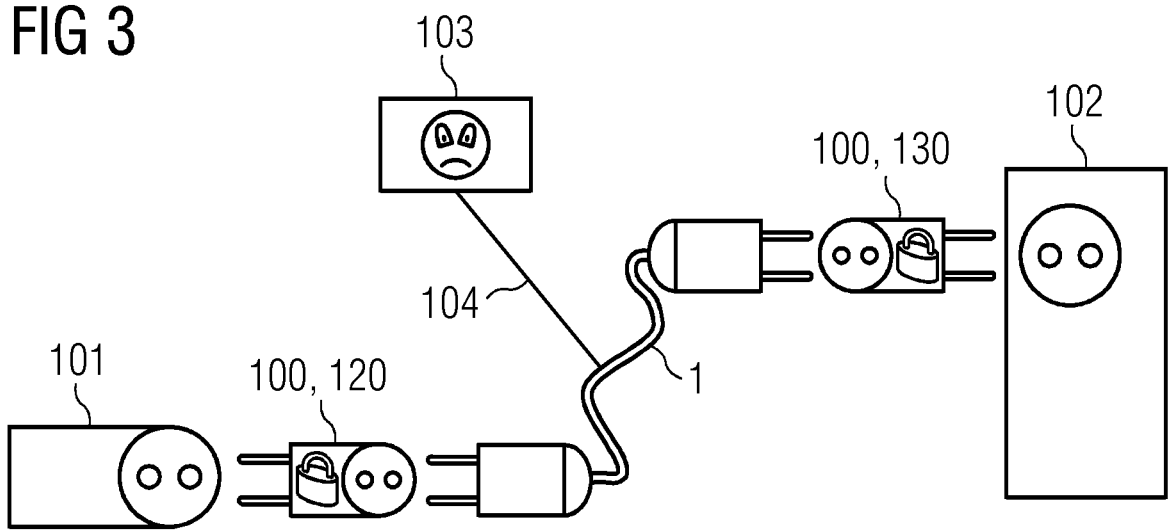
FIG. 3 shows a schematic illustration of an attack scenario with a conventional data transmission apparatus and a protective apparatus according to embodiments of the invention.

FIG. 3 illustrates an attack scenario with a conventional data transmission apparatus 1 in conjunction with a protective apparatus 100 according to one embodiment, comprising two protective devices 120 and 130 which are in the form of plug connectors or adapters. For secure data transmission, the protective devices 120, 130 of the protective apparatus 100 are each connected to one end of the data transmission device 1 and to the devices 101, 102. The illustrated locks each symbolize the crypto unit integrated in the protective devices 120, 130. In this case, an attacker 103 can neither read data from the conventional data transmission device 1 nor feed in data.

The protective device 20, 30 preferably deletes the security information or else cancels the security function if a physical manipulation attempt is determined or if the protective apparatus or one of the assigned protective devices is intended to be disabled.

Figure 4:
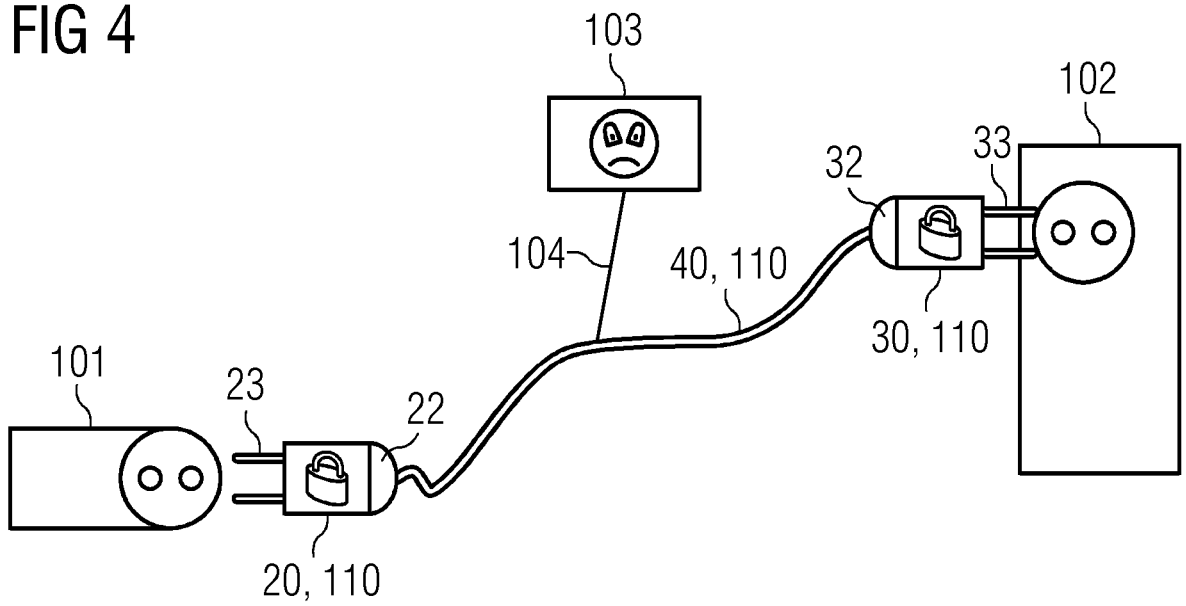
FIG. 4 shows a schematic illustration of an attack scenario with a network cabling apparatus according to embodiments of the invention.

FIG. 4 shows an attack scenario with a network cabling apparatus 110 according to embodiments of the invention. The network cabling device 110 respectively has a protective device 20, 30 which is firmly connected to a data transmission apparatus 40. The protective devices 20, 30 can be fastened to a conventional network cable of the required length or may be in the form of a complete cable with the corresponding protective devices 20, 30 for connection to the devices 101, 102.

The protective devices 20, 30 or 120, 130 are connected to the data transmission device 1 or else to the devices 101, 102 in a lead-sealable manner in order to easily detect release of the protective device. Withdrawal protection can also be separately formed for the second interface to the network connection of the device 101, 102 and for the first interface to the data transmission device 1, 40 or may be in the form of withdrawal protection via both interfaces. Combined withdrawal protection which jointly extends over the first and second interfaces may also be formed.

A protective device 100 or a network cabling apparatus 110 which has more than two protective devices 120, 130 or 20, 30 can be used to ensure, for example, communication security between a plurality of devices connected to one another during bus-based communication or in a broadcast/multicast environment.

Mutual authentication of the protective devices of a protective apparatus is likewise provided by the identically preconfigured cryptographic function. Only protective devices which have an identically configured cryptographic function can also again decrypt the data encrypted by one of the protective devices and vice versa.

Cryptographic protection of data transmission can therefore be easily achieved by using a network cabling apparatus according to embodiments of the invention instead of a normal network cable or a normal data transmission device.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A protective apparatus for the protected transmission of data between two communicating devices, comprising two protective devices which are assigned to one another and can each be connected to one end of a data transmission apparatus, each protective device having:
a first interface for connection to the data transmission apparatus;
a second interface for directly plugging into a communicating device of the two communicating devices; and
a crypto unit which has a cryptographic function that can be configured in an equivalent manner on each of the assigned protective devices and which cryptographically protects the data to be transmitted;
wherein the protective devices are releasable external connectors, wherein the first interface releasably connects to the data transmission apparatus and the second interface releasably plugs into a respective communicating device of the two communicating devices.

2. The protective apparatus as claimed in claim 1, wherein at least one of the protective devices has a display unit which provides a status signal on the basis of the operating status of the cryptographic connection set up between the protective devices, wherein the status signal is selected from at least one of an electrical status signal and an optical status signal.

3. The protective apparatus as claimed in claim 1, wherein the cryptographic function is fixed or changeable.

4. The protective apparatus as claimed in claim 1, wherein the cryptographic function cryptographically protects the data on a physical transmission level according to an OSI reference model.

5. The protective apparatus as claimed in claim 4, wherein the data is modulated by means of a cryptographic spreading code.

6. The protective apparatus as claimed in claim 1, wherein the cryptographic function cryptographically protects the data on a data link layer according to an OSI reference model.

7. The protective apparatus as claimed in claim 1, wherein the cryptographic function cryptographically protects the data on a network layer according to an OSI reference model.

8. The protective apparatus as claimed in claim 7, wherein each protective device is assigned one of a fixed IP address and an IP address provided by the connected device via the second interface.

9. The protective apparatus as claimed in claim 1, wherein the cryptographic function cryptographically protects the data on a transport layer according to an OSI reference model.

10. The protective apparatus as claimed in claim 1, wherein the crypto unit outputs incoming data with at least one of a firmly predefined time delay and a delay dependent on a type of data transmission.

11. The protective apparatus as claimed in claim 1, wherein at least one of the protective devices has a current, the current drawn from a current source;
further wherein the current source is selected from at least one of an integrated current source, one of the connected devices via the second interface, one of the connected devices via a third interface, and a data transmission signal.

12. The protective apparatus as claimed in claim 1, wherein at least one of the protective devices has withdrawal protection for releasing at least one of the first interface from the data transmission apparatus and the second interface from the device.

13. The protective apparatus as claimed in claim 1, wherein at least one of the protective devices cancels the cryptographic function if the protective device is disabled.

14. The protective apparatus as claimed in claim 1, wherein at least one of the protective devices cancels the cryptographic function if manipulation of the protective device is determined.

15. The protective apparatus as claimed in claim 1, wherein the cryptographic function is configured differently for different transmission directions between the protective devices.

16. A network cabling apparatus for transmitting data between two communication devices, comprising:
a protective apparatus comprising two protective devices which are assigned to one another, and
a data transmission device having at least two ends, the at least two ends of the data transmission device being connected to one protective device of the protective apparatus in each case,
wherein each protective device includes:
a first interface for direct connection to the data transmission device,
a second interface for directly plugging into a communication device of the two communication devices, and
a crypto unit which has a cryptographic function that can be configured in an identical manner on each of the assigned protective devices and which cryptographically protects the data to be transmitted,
further wherein the protective devices are releasable connectors, the first interface releasably connects to the data transmission device, and the second interface releasably plugs into a respective communication device of the two communication devices.

17. The network cabling apparatus as claimed in claim 16, wherein the data transmission device is a cable for transmitting electrical signals or a fiber-optic cable.

18. The network cabling apparatus as claimed in claim 16, wherein the cryptographic function is configured differently for different transmission directions between the protective devices.

* * * * *